(12) United States Patent
Winters et al.

(10) Patent No.: US 9,792,614 B2
(45) Date of Patent: Oct. 17, 2017

(54) AUTOMATED INTEGRATION OF PARTNER PRODUCTS

(75) Inventors: Alan Adams Winters, Lindon, UT (US); Jessica Louise Petersen, Salt Lake City, UT (US); Kevin Gary Smith, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 2168 days.

(21) Appl. No.: 11/692,851

(22) Filed: Mar. 28, 2007

(65) Prior Publication Data
US 2007/0233511 A1    Oct. 4, 2007

Related U.S. Application Data

(60) Provisional application No. 60/786,868, filed on Mar. 28, 2006.

(51) Int. Cl.
*G06Q 30/02* (2012.01)
*G06Q 10/10* (2012.01)
*G06Q 30/06* (2012.01)

(52) U.S. Cl.
CPC ............. *G06Q 30/02* (2013.01); *G06Q 10/10* (2013.01); *G06Q 30/0601* (2013.01)

(58) Field of Classification Search
CPC ........ G06Q 10/00; G06Q 10/06; G06Q 30/02; G06F 17/60
See application file for complete search history.

(56) References Cited

U.S. PATENT DOCUMENTS

| | | | |
|---|---|---|---|
| 6,115,690 A * | 9/2000 | Wong ................ | G06Q 10/0633 700/237 |
| 7,225,249 B1 * | 5/2007 | Barry et al. ................. | 709/227 |
| 7,319,996 B2 * | 1/2008 | Chen et al. | |
| 7,725,356 B2 * | 5/2010 | Shah et al. .................. | 705/27.1 |
| 7,752,313 B2 * | 7/2010 | Adelman ............ | G06Q 20/027 705/34 |
| 2002/0010651 A1 * | 1/2002 | Cohn ..................... | G06Q 30/06 705/26.44 |
| 2002/0023007 A1 * | 2/2002 | Lee ................................ | 705/26 |
| 2002/0095356 A1 * | 7/2002 | Tonegawa et al. ............ | 705/27 |
| 2002/0123957 A1 * | 9/2002 | Notarius et al. ............... | 705/37 |
| 2002/0178075 A1 | 11/2002 | Emerick et al. | |
| 2003/0037153 A1 * | 2/2003 | Ouchi ......................... | 709/230 |
| 2003/0065558 A1 * | 4/2003 | Shaw et al. .................... | 705/14 |

(Continued)

OTHER PUBLICATIONS

"Web Services Now a value added tool for Portal Vendors", by John Harney, AIIM E—Doc Magazine; Mar./Apr. 2003.*

(Continued)

*Primary Examiner* — Pan Choy
(74) *Attorney, Agent, or Firm* — Kilpatrick Townsend & Stockton LLP

(57) ABSTRACT

Automated integration of partner products in connection with a web analytics application is facilitated. A list of available partner products is displayed, and the user is provided with an opportunity to select one or more of the displayed partner products. A wizard is presented, allowing the user to configure the partner product by specifying and mapping metrics, dimensions, and the like. Partner product integration then takes place automatically, thereby simplifying the process by which such integrations can be implemented.

14 Claims, 24 Drawing Sheets

(56) References Cited

U.S. PATENT DOCUMENTS

| | | | | |
|---|---|---|---|---|
| 2003/0084127 | A1* | 5/2003 | Budhiraja | G06F 8/20 709/220 |
| 2003/0105887 | A1* | 6/2003 | Cox et al. | 709/328 |
| 2003/0126027 | A1* | 7/2003 | Nelson | G06Q 30/0601 705/26.1 |
| 2003/0144858 | A1* | 7/2003 | Jain et al. | 705/1 |
| 2004/0003353 | A1* | 1/2004 | Rivera et al. | 715/530 |
| 2004/0199541 | A1 | 10/2004 | Goldberg et al. | |
| 2005/0222931 | A1* | 10/2005 | Mamou | G06Q 10/10 705/35 |
| 2005/0223392 | A1* | 10/2005 | Cox | G06Q 10/06 719/328 |
| 2006/0009944 | A1* | 1/2006 | Shah et al. | 702/123 |
| 2007/0198438 | A1* | 8/2007 | Bentley | G06Q 30/00 705/80 |
| 2008/0126110 | A1* | 5/2008 | Haeberle et al. | 705/1 |
| 2008/0140554 | A1* | 6/2008 | Christy | G06Q 40/06 705/35 |

OTHER PUBLICATIONS

"STC Banner Web General User Guide", SunGard SCT, Jan. 2005, Release 7.0.*

"Reconfigurable Web Service Integration in the Extended Logistics Enterprise", by Alex Talevski et al., IEEE Transactions on Industrial Informatics, vol. 1, No. 2, May 2005.*

"Design and Implementation of an RSVP-Based Quality of service Architecture for an Integrated Service Internet", by Tsipora P. Barzilai and Dilip D. Kandlur, IEEE Journal on selected area in communications, vol. 16, No. 3, Apr. 1998.*

"Achieving Competitive Advantage through Supply Chain Integration", by Robert Sturim, 1999, Vitria Technology, Inc. 945 Stewart Drive, Sunnyvale, CA 94086.*

"Building the Executive Dashboard", by Marc L. Resnick, Florida International University, Proceedings of the Human Factors and Ergonomics Society 47th Annual Meeting, 2003.*

"Playing Partner Games—Web Integrations need close Ties with Vendors", by Marie Lingblom, CRN; Mar. 26, 2001; 938; ABI/INFORM Global, p. 39.*

"Autonomous Mapping of E-Business Demands and Supplies via Invisible Internet Agent", by Hanh Pham et al., Electronic Commerce Research; Jul.-Oct. 2003; 3, 3-4; ProQuest Central, p. 365.*

"Web Services for Presence Based Application Development", by Rajesh Karunamurthy, The Department of Electrical and Computer Engineering, Concordia University, Montreal, Canada, Sep. 2004.*

"Playing Partner Games Web Integrations need close ties with Vendors", by Marie Lingblom, CRN; Mar. 26, 2001; 938; ABI/INFORM Global, p. 39.*

"Effective Customer Relationship Management Through Web Services", by Jaymeen R. Shah and Mirza B. Murtaza, The Journal of Computer Information System; Fall 2005; 46, 1; ProQuest, p. 98.*

International Search Report from WO 2007/112131, Jan. 17, 2008, 2 pages.

* cited by examiner

FIG. 4

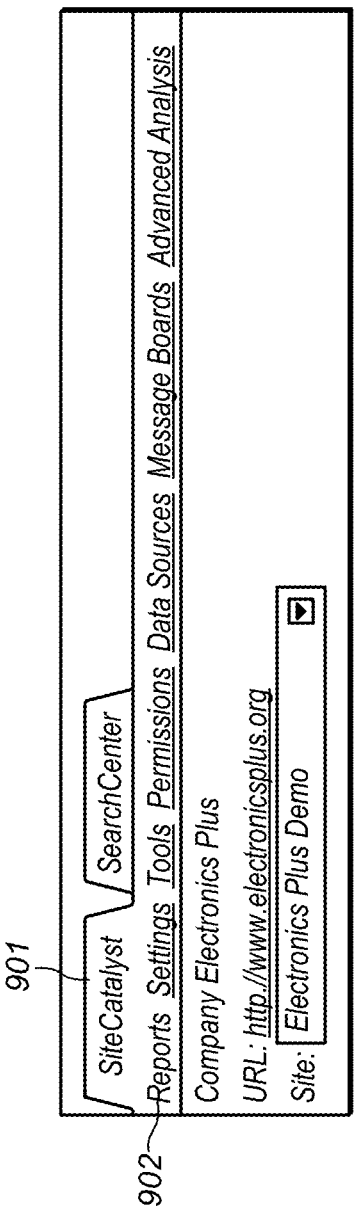
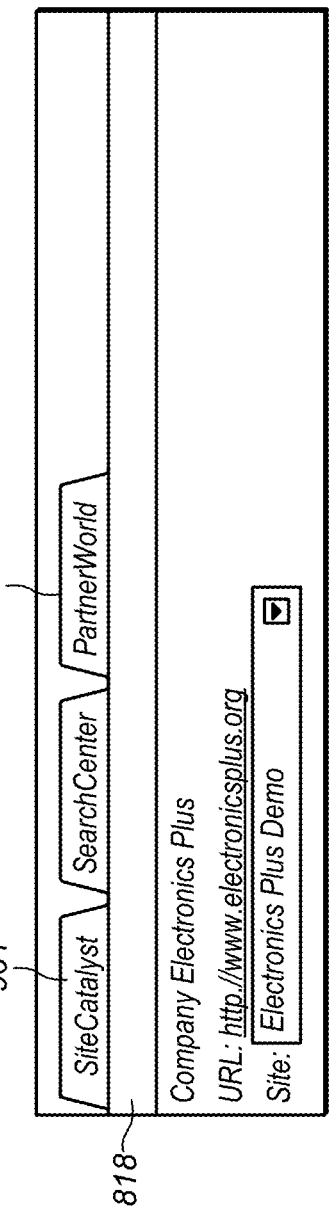
FIG. 9A
FIG. 9B

*Partner Showcase*

Partner Showcase
819
See showcase of Omniture's Alliance integration partners. Submit Omniture partner suggestions.

*PartnerDS*

PartnerDS
820
See Alliance Partner integrations you've activated and activate new integrations.

*Partner Integration Resources*

Partner Integration Resources
821
Access white papers and training modules to guide you through Alliance Partner integration efforts.

*Other Integration Related Tools*

Other Integration-Related Tools
822
Access Data Warehouse, SAINT, and other integration-related tools.

SiteCatalyst

Activate a Data Source — Step 1 of 7

Data Source Name
This name will appear in the Data Source Manager.
Name: [Partner Integration] ~1502

E-mail
This e-mail address will receive any confirmations or notices concerning this Data Source.
E-mail: [partner@omniture.com] ~1503

[<Back] [Next>]
[Cancel]

Activate a Data Source — Step 2 of 7

Choose Metrics
Describe the metrics that you would like to import into SiteCatalyst.

☑ Impressions ~1505
☐
☐
~1506

[<Back] [Next>]
[Cancel]

Activate a Data Source — Step 3 of 7

Choose Metrics
Map your metric descriptions to the SiteCatalyst metric of your choice.

SiteCatalyst events are used to contain all imported metrics. Please map the metrics you are importing to SiteCatalyst events. Please choose these relationships carefully. Choosing events already in use for other purposes can damage your SiteCatalyst data.

| Metric Description | SiteCatalyst Metric |
|---|---|
| Impressions | Event 12 (Tax) ▼ |
| ~1507 | ~1508 |

[<Back] [Next>]
[Cancel]

/ SiteCatalyst \ / SearchCenter \ / PartnerWorld /
Your Marketing World   Partner Showcase   PartnerDS   Integration Resources   Integration Tools Company Electronics Plus
URL: http://www.electronicsplus.org
Site: [ Electronics Plus Demo  ▼ ]

PARTNERS bleClick   Google   YAHOO! SEARCH MARKETING   salesforce   msn

Your Marketing World

818 — Your Marketing World — Integrate your marketing world into Omniture Sitecatalyst. Click here for a directory of Omniture's Alliance Partners.

1104 — Ad Serving: DFA — DoubleClick — Event Registration: Wingate — WINGATE STUDIOS — Edit Deactivate
1105 — Edit Deactivate Affiliate Mktg: Linkshare — LinkShare — Internal Search: Endeca — ENDECA — Edit Deactivate
Edit Deactivate CRM: Salesforce.com — salesforce.com — Platform: RichFX — RICHFX — Edit Deactivate
1104 — Edit Deactivate — 1104

Cust Sat: Foresee Results — FORESEE — Rich Commerce: Allurent — allurent — Edit Deactivate
Edit Deactivate — 1105

E-mail Mktg: DARTmail — DoubleClick — Search Mktg: SearchCenter — SearchCenter — Edit Deactivate
Edit Deactivate E-mail Mktg: Responsys — Responsys — Site Hygiene: Maxamine — MAXAMINE — Edit Deactivate
Edit Deactivate

1102

OMNITURE SiteCatalyst

Partner Showcase

🔍 Partner Showcase — See showcase of Omniture's Alliance integration partners. Submit Omniture partner suggestions.
819

PartnerDS

📁 PartnerDS — See Alliance Partner integrations you've activated and activate new integrations.
820

Partner Integration Resources

🔍 Partner Integration Resources — Access white papers and training modules to guide you through Alliance Partner integration efforts.
821

Other Integration Related Tools

📁 Other Integration-Related Tools — Access Data Warehouse, SAINT, and other integration-related tools.
822

SiteCatalyst

AUTOMATED INTEGRATION OF PARTNER PRODUCTS

CROSS-REFERENCE TO RELATED APPLICATIONS

This patent application claims priority from U.S. Provisional Patent Application Ser. No. 60/786,868 filed Mar. 28, 2006, for "Automated Integration of Partner Products", which is incorporated herein by reference.

FIELD OF THE INVENTION

The present invention is related to data integration, and more particularly to techniques for integrating data from multiple partners into a web analytics application.

DESCRIPTION OF THE BACKGROUND ART

The present invention provides a technique for integrating data from multiple partners into a web analytics application such as SiteCatalyst (available from Omniture, Inc. of Orem, Utah). Many prior art data sources' interfaces are not intuitive, and do not provide sufficient visibility into partners with which customers can integrate. In addition, prior art systems do not generally present those partners, or the ability to integrate with them, in a way that motivates customers, partners, or press/analysts.

SUMMARY OF THE INVENTION

The present invention provides techniques for improving integration of user interfaces for web analytics software tools, for simplifying and clarifying the ability to integrate with partner products, and also for branding the integration with the provider of the web analytics software with a global partner network.

In addition, the present invention provides techniques for improving communication to customers as to which partners have integration agreements with the provider of the web analytics software. In one user scenario, a customer has data within a partner product that is relevant to data in the web analytics tool and creates an integration to tie the two data sets together.

In another user scenario, a customer seeks to understand which partners have partnered with the web analytics software provider and wants to understand how to utilize that partnership. The customer views partners within a partner showcase to learn more.

BRIEF DESCRIPTION OF THE DRAWINGS

The Figures provide an illustration of a technique for implementing the present invention according to one embodiment.

FIG. 4 is a screen shot depicting a list of various types of solution partners, including information and instructions for each.

FIGS. 9A and 9B depict two examples of a UI navigation scheme for a software application that implements the present invention.

FIG. 10 depicts an example of a partners home page, as may be displayed in connection with the Partners Tab box of FIG. 8.

FIG. 11 depicts a detail of the top section of the partners home page shown in FIG. 10.

FIG. 12 depicts a detail of the bottom section of the partners home page shown in FIG. 10.

FIGS. 15A, 15B, and 15C depict an example of steps 1 to 3 of a partner data sources wizard.

FIGS. 16A, 16B, and 16C depict an example of steps 4 to 6 of a partner data sources wizard.

FIG. 17 depicts an example of a screen for viewing and editing the customer's marketing world.

FIG. 21 depicts an example of a screen for viewing and editing partner information in a partner showcase.

DETAILED DESCRIPTION

Figure 1:
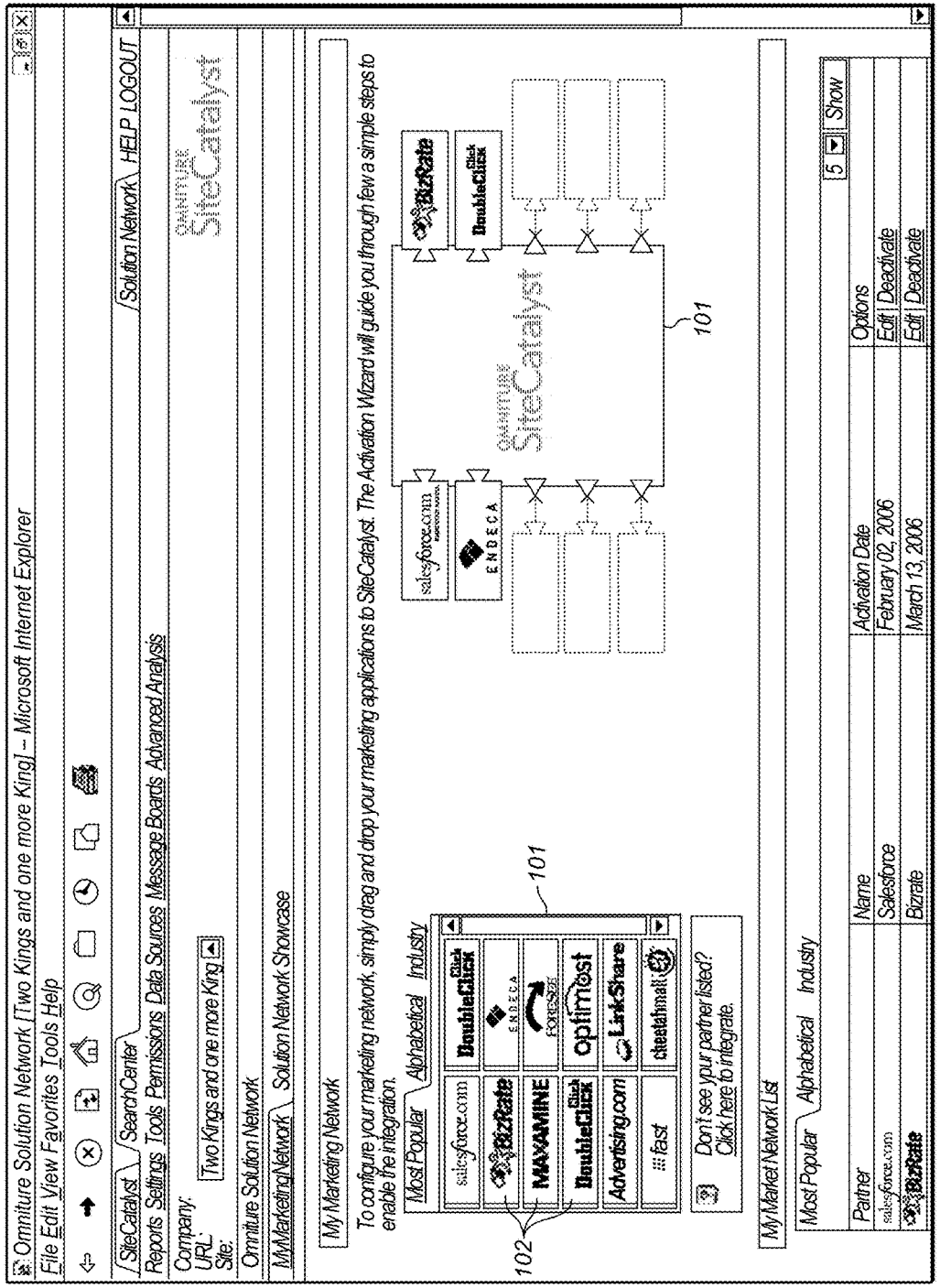
FIGS. 1 and 2 are screen shots depicting a user interface for adding marketing applications to a web analytics tool.

For purposes of the present invention, an integration is a process of incorporating partner data into a data structure of a web analytics tool. For example, it may be desirable to integrate email campaign information, CRM system information, ad serving, search terms, and the like. Integrations can cause data to be sent from the partner to the web analytics tool, or vice versa. In some cases, integrations can facilitate a bidirectional flow of data. For example, for an email integration, the web analytics tool might receive campaign data from a partner, track visitor information to the site, and export information about visitors that behave a certain way and send it to the partner.

The present invention provides a user interface to allow partners to easily integrate with a web analytics tool via an intuitive, drag-and-drop interface. The techniques described herein facilitate a smooth and straightforward integration path for most partner data elements.

In one embodiment, a Partner Product Palette (PPP) assists in the automation of data integration from various online marketing ecosystem partners. A backend tool allows marketing to add to and customize the partner products displayed within the PPP. This tool allows marketing to associate a partner product with an appropriately typed data source (data import tool). For example, an e-mail vendor can be associated with an e-mail type data source. Once added, the partner product appears within the Partner Product Palette and the customers can begin the process of integrating their vendor's data into the web analytics tool.

The addition of new partner products instantly provides an automated data integration system for existing customers who currently use the added product. The PPP also allows marketing to control the visibility of each partner product and to organize these products by industry without writing any code to control the partner products. The tool gives them the ability to associate white papers, help links, logos, training videos, and other pertinent data regarding the data integration.

The following is a sample use case illustrating the use of PPP:

1. A partner product is approved by business development.
2. Business development adds the partner product through a user interface to manage the mechanism by which a partner product resides in the Partner Product Palette. The data entered include the product name, product information, company information, a product logo, product help documents, html links to training videos, the rank of product use, the industry to which this product belongs, and which data source type this product should use for integration.
3. A customer visits the Solutions Network page in the web analytics tool and can view the Partner Product Palette containing partner product logos and sort the partners by product name and by product industry.
4. A customer can then drag the partner product logo from the Partner Product Palette to the integrations area and begin the process of integrating that partner's data into the web analytics tool.

The Figures provide an illustration of a technique for implementing the present invention according to one embodiment.

FIG. 1 depicts a screen shot of a user interface for adding marketing applications to a web analytics tool. In one embodiment, the user can initiate integration of one or more marketing application(s) 102 by dragging and dropping marketing application(s) 102 from a repository 100 to a representation of the web analytics tool 101.

Figure 2:
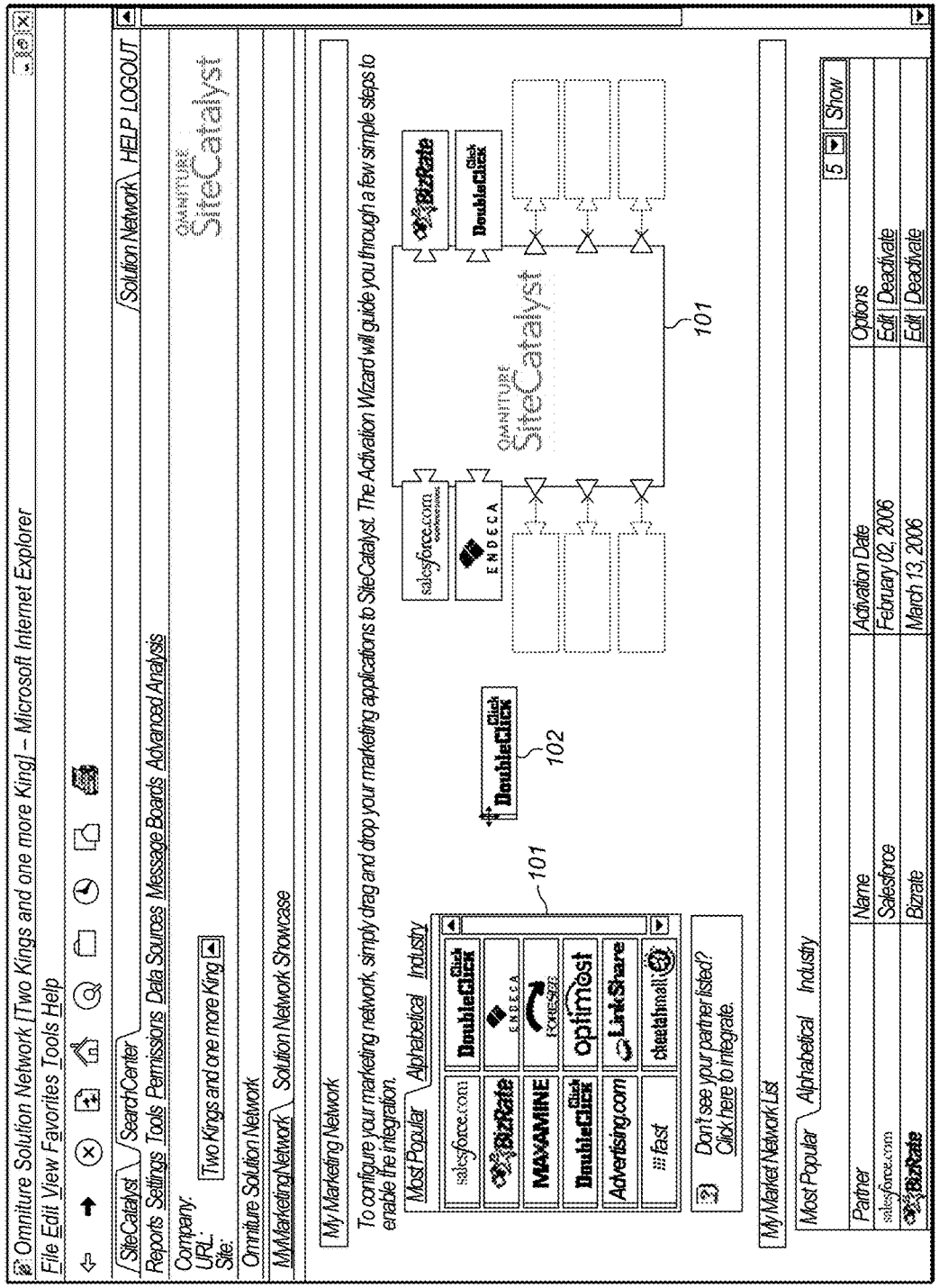

In FIG. 2, the user in the process of dragging marketing application 102 to web analytics tool 101.

Figure 3:
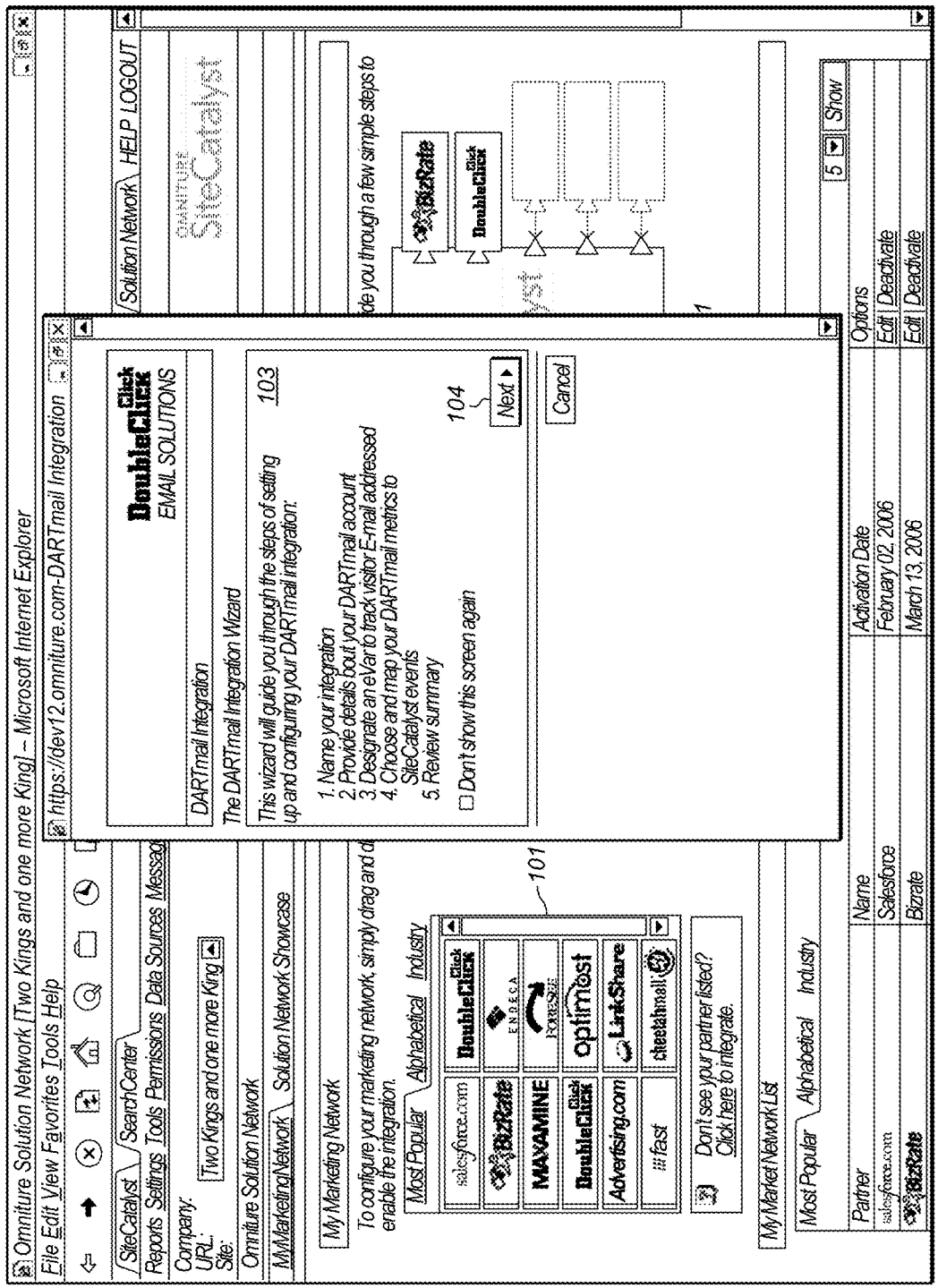
FIG. 3 is a screen shot depicting a dialog box for configuring a marketing application.

FIG. 3 depicts a screen shot of a dialog box 103 for configuring the marketing application that was dragged to the web analytics tool 101. In one embodiment, dialog box 103 presents a wizard that guides the user through the various steps involved, including for example naming the integration, providing details about an account associated with the marketing application, designating an eVar, mapping metrics to events, and reviewing a summary of the setup. Clicking on Next button 104 causes the wizard to proceed through the various steps involved.

Figure 4:
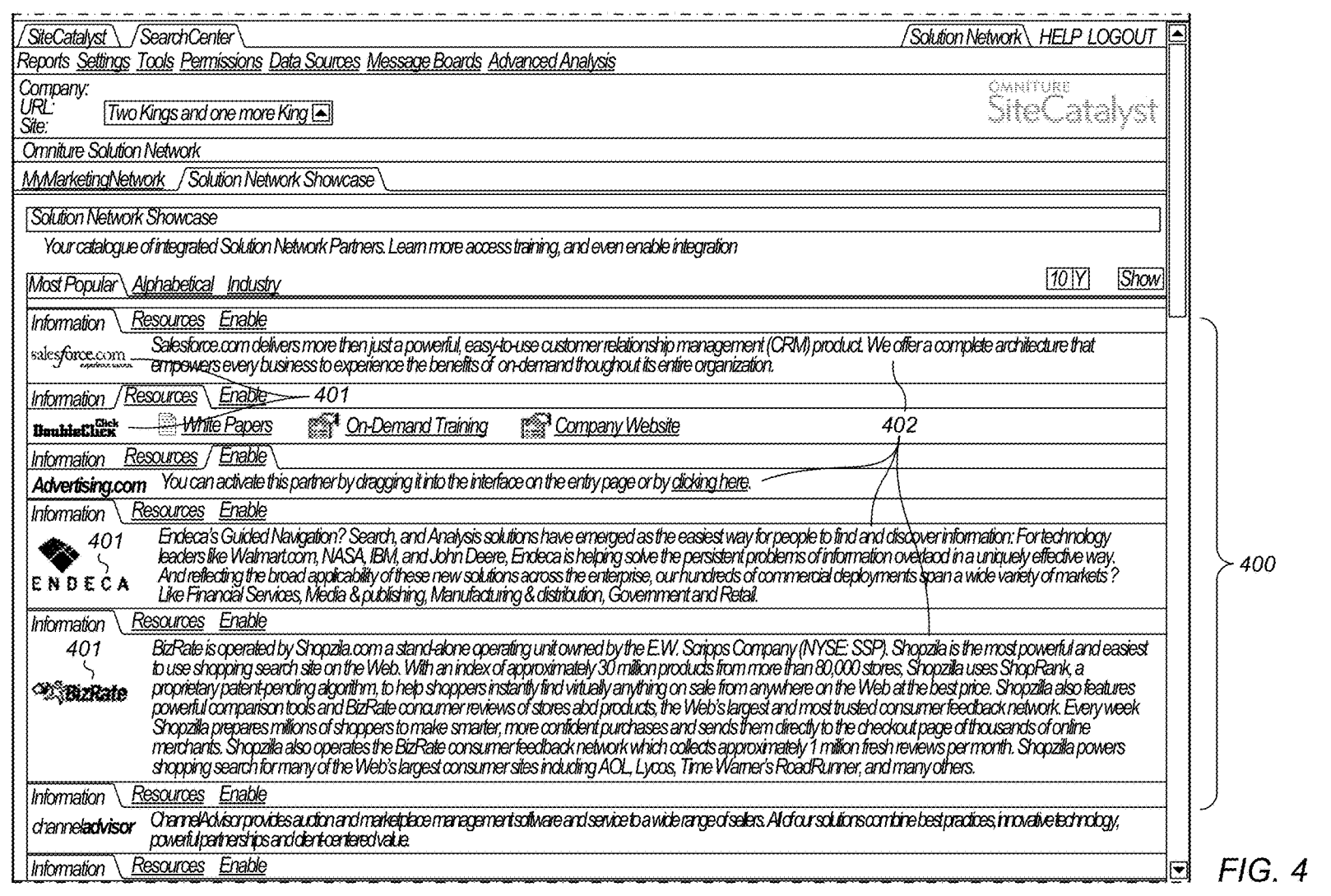

FIG. 4 depicts a screen showing a list 400 of various types of solution partners 401, including information and instructions 402 for each.

Figure 5:
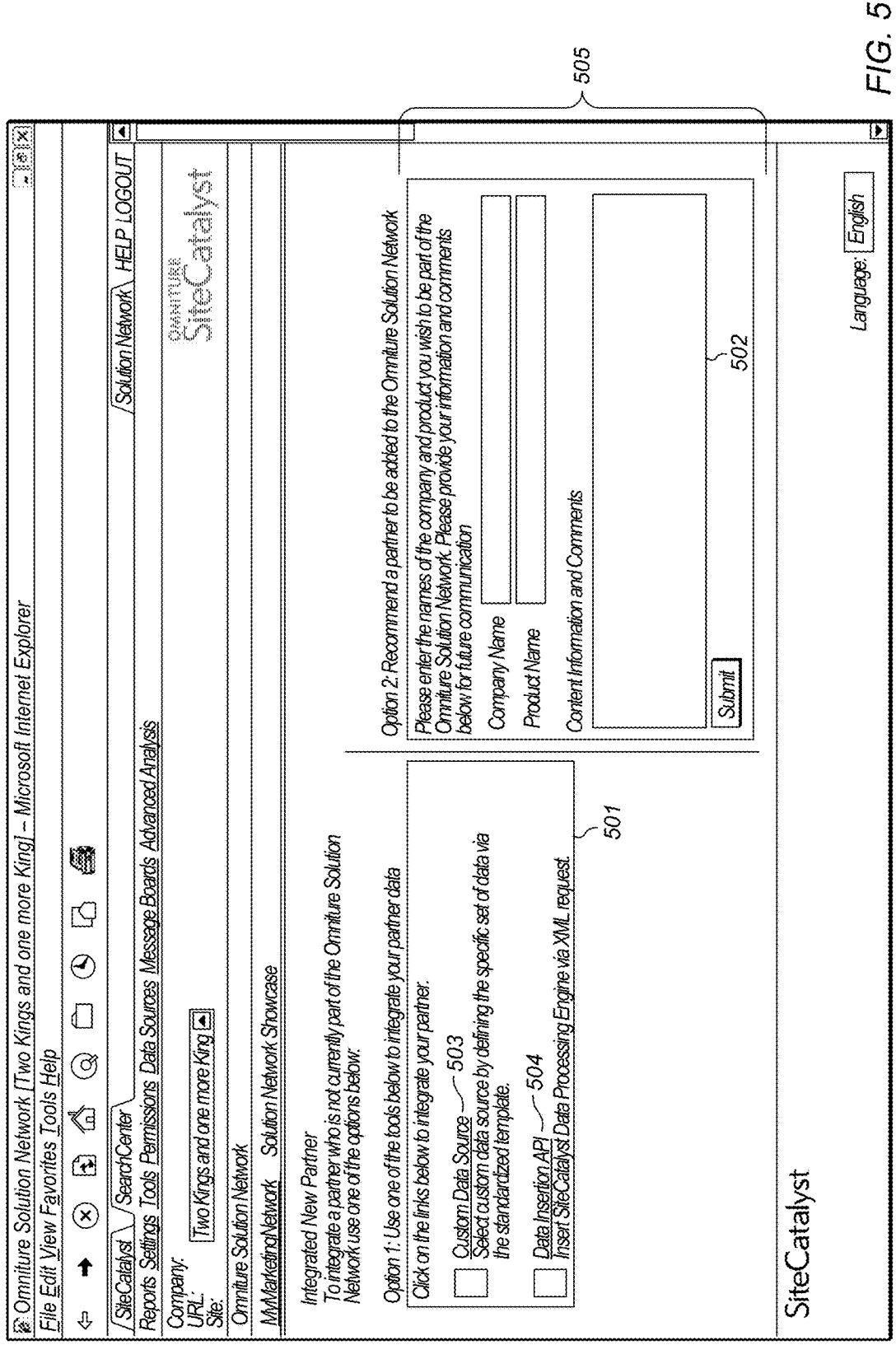
FIG. 5 is a screen shot depicting steps for integrating a partner that is not currently part of a solution network.

FIG. 5 depicts a screen showing steps 501, 502 for integrating a partner that is not currently part of the solution network: the user can set up a custom data source 503 by defining a specific set of data via a standardized template, or can insert data into the data processing engine via XML request 504. Alternatively, the user can fill out a web-based form 505 for recommending a partner to be added to the network.

Figure 6:
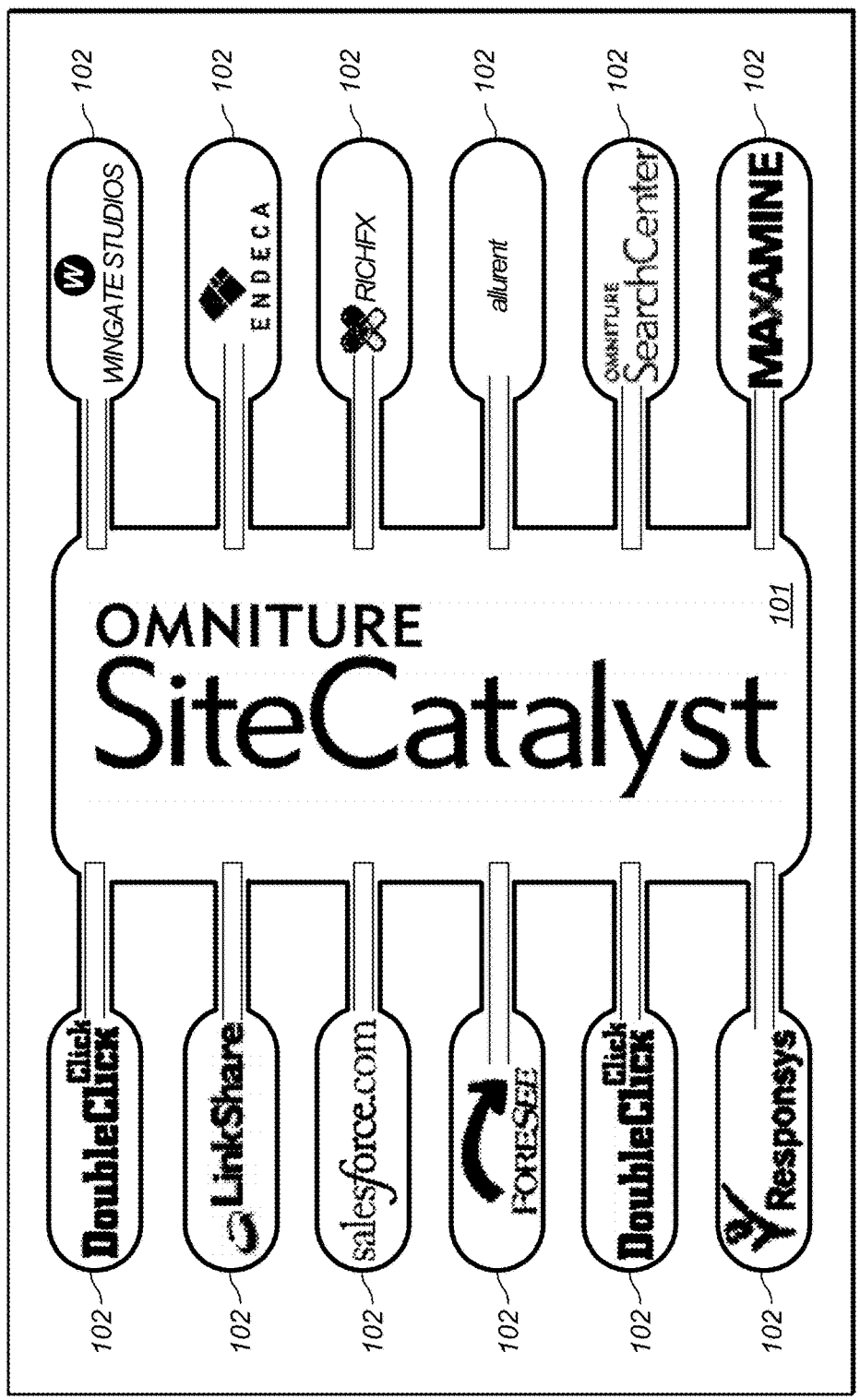
FIG. 6 is a graphical depiction of the relationship between a web analytics tool and various partners.

FIG. 6 is a graphical depiction of the relationship between a web analytics tool 101 and various marketing applications 102 associated with partners. For purposes of the following description, marketing applications 102 are also referred to herein simply as partners 102.

Figure 7:
FIG. 7 is a flowchart depicting a current method for integrating a partner with a web analytics tool.

FIG. 7 is a flowchart depicting one method for integrating a partner 102 with a web analytics tool. A user logs in 700, configures data sources 701. The user then configures an import/naming tool referred to as SiteCatalyst Attribute Import and Naming Tool (SAINT) 702. SAINT can be used to bulk-import additional campaign attributes or classifications to the data. Next, the user configures 703 a data warehouse to act as a source and/or destination for data associated with the partner 102. The integration is then complete 704.

Figure 8:
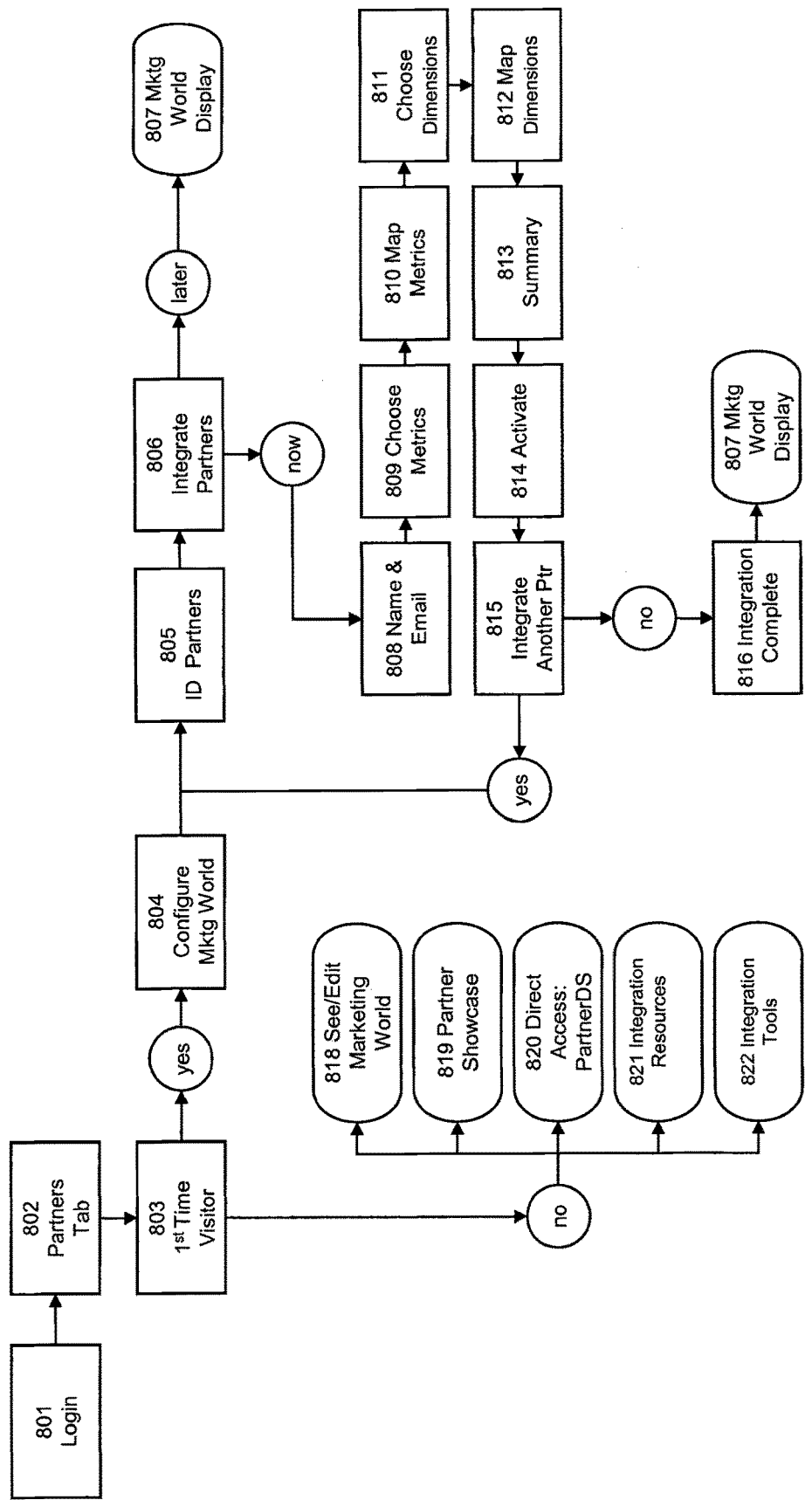
FIG. 8 is a flowchart depicting an enhanced method for integrating a partner with a web analytics tool.

FIG. 8 is a flowchart depicting an enhanced method for integrating a partner with a web analytics tool, according to one embodiment of the present invention.

A user logs in 801 and selects a partners tab 802 in a user interface, so as to indicate that he or she is interested in integrating a partner 102. A determination is made 803 as to whether the user is a first-time visitor. If so, the user is presented with a wizard to implement configuration 804 of his or her marketing world. First, the user is given an opportunity to identify 805 partners 102 to be integrated. Then, the user is given an option 806 to integrate partners 102 now or later. If the user chooses to do it later, he or she exits the integration mechanism and is presented with a display 807 of the marketing world.

If the user, in 806, chooses to integrate partners 102 now, steps 808 through 814 are performed in the form of a data sources wizard. First, the user provides 808 a name and email address. Then, he or she chooses 809 the metrics that he or she wishes to apply to the data from the partner 102. These metrics are then mapped 810 with the data available from the partner 102. The user can then choose data dimensions 811 for breaking down the selected metric(s), and the dimensions are mapped 812. The user is presented 813 with a summary of the integration, and can then choose to activate 814 it.

If the user wishes to integrate 815 another partner 102, he or she is returned to step 805. Otherwise, the integration is complete. The user exits the integration mechanism and is presented with a display 807 of the marketing world.

If, in 803, the user is not a first-time visitor, he or she is given options to view or edit the marketing world 818, or to view the partner showcase 819, or to view and modify 820 partner integrations, or partner data sources 821, or to control integration tools 822.

FIGS. 9A and 9B depict two examples of a UI navigation scheme for a software application that implements the present invention. In FIG. 9A, a SiteCatalyst tab 901 provides access to various functions such as reports 902, settings 903, tools 904, permissions 905, data sources 906, message boards 907, and advanced analysis 908. In FIG. 9B, a PartnerWorld tab 909 has been added, providing access to the various functions described in connection with FIG. 8, including marketing world 818, partner showcase 819, viewing and modifying 820 partner integrations to information from one or more partners, partner data sources 821, and integration tools 822.

Figure 10:
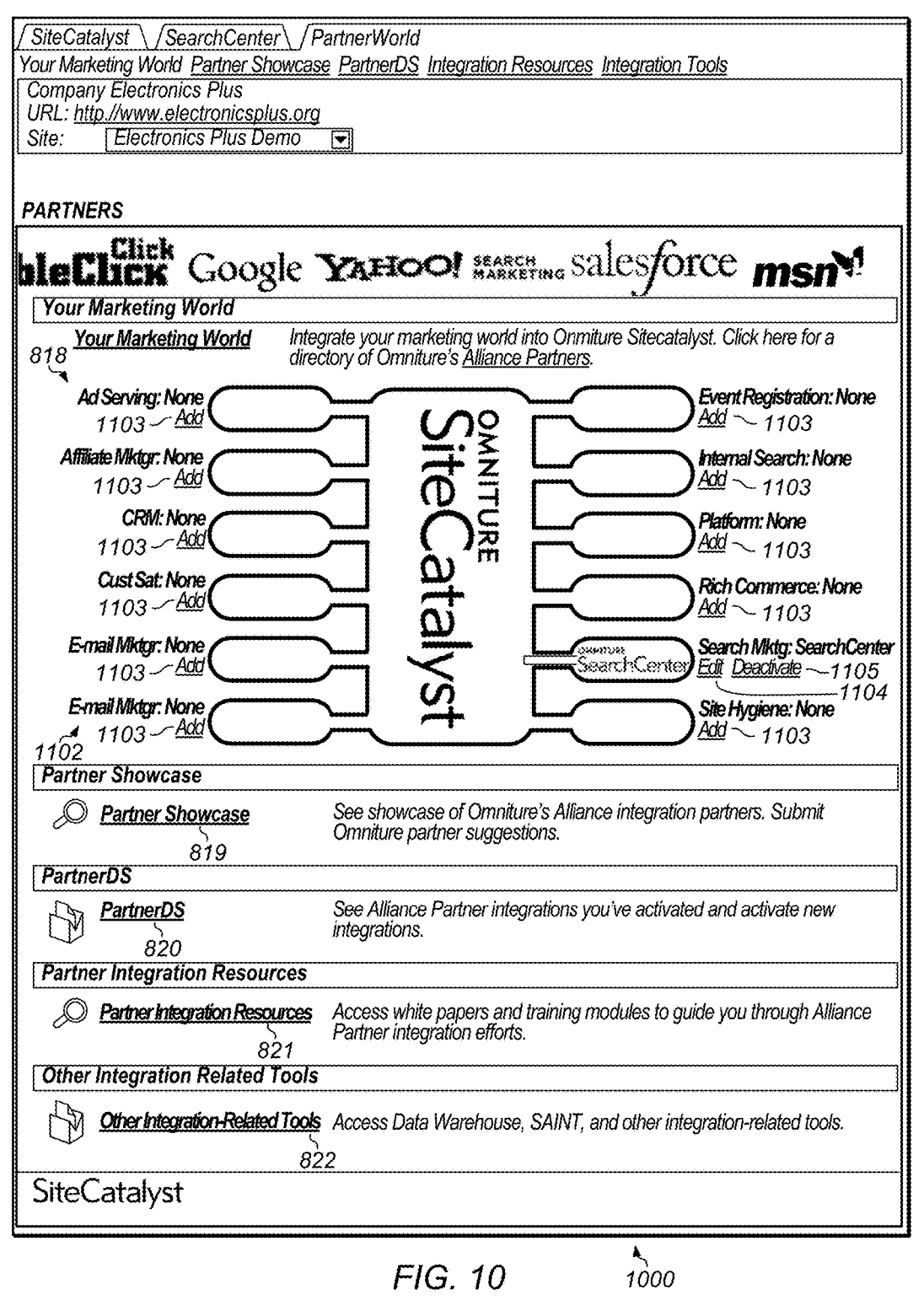

FIG. 10 depicts an example of a partners home page 1000, as may be displayed in response to user activation of PartnerWorld tab 909 in FIG. 9B. Page 1000 provides another navigation path to the same functions described in connection with FIG. 8, including marketing world 818, partner showcase 819, viewing and modifying 820 partner integrations to information from one or more partners, partner data sources 821, and integration tools 822. Page 1000 provides additional description of each of these options in an expandable/collapsible segment of the overall display. The currently active segment (marketing world 818) includes a configuration wizard 1102 of configuring the marketing world. Configuration wizard 1102 includes various links for adding 1103, editing 1104, and/or deactivating 1105 partner integrations.

Figure 11:
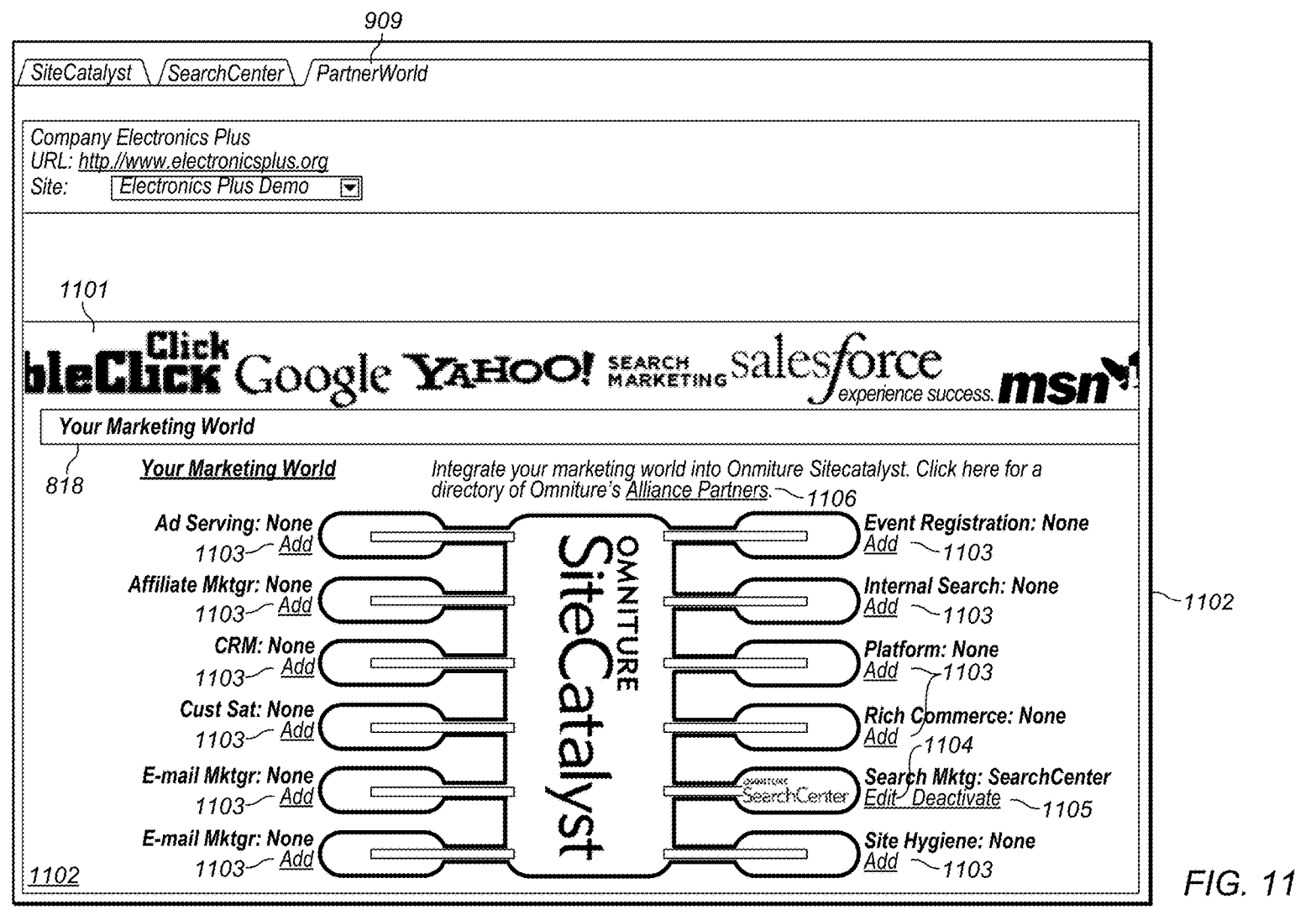

FIG. 11 depicts a detail of the top section of the partners home page 1000 shown in FIG. 10. In one embodiment, scrolling banner 1101 is included, showing various partner logos. Configuration wizard 1102 includes various links for adding 1103, editing 1104, and/or deactivating 1105 partner integrations. Also provided is a link 1106 to a directory of alliance partners.

FIG. 12 depicts a detail of the bottom section of the partners home page 1000 shown in FIG. 10. Links to marketing world 818, partner showcase 819, viewing and modifying 820 partner integrations to information from one or more partners, partner data sources 821, and integration tools 822 are included. Adjacent to each link is a description of the associated functionality.

Figure 13:
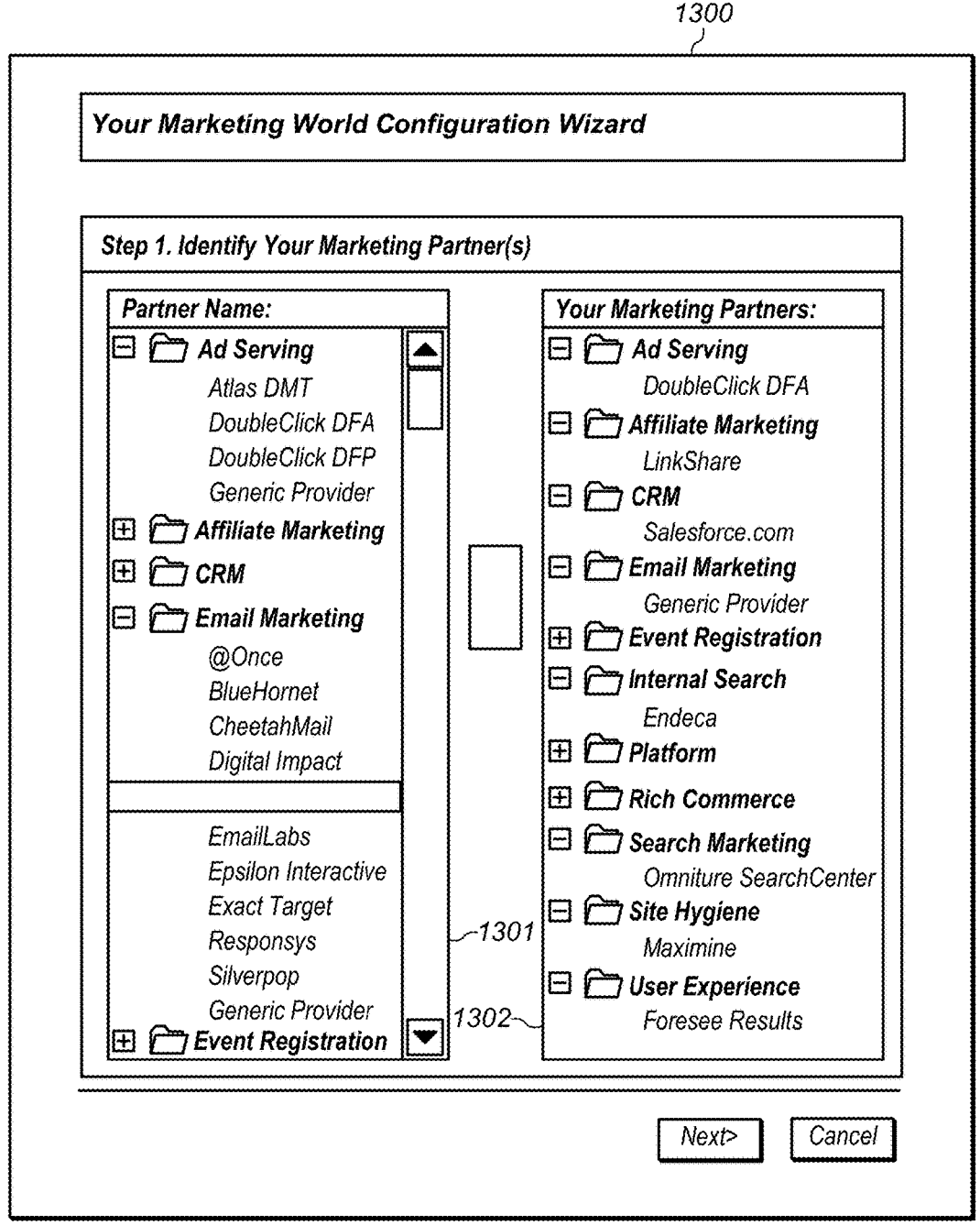
FIG. 13 depicts an example of step 1 of a configuration wizard as may be displayed if the user is a first-time visitor.

FIG. 13 depicts an example of step 1 of a configuration wizard (ID partners) 1300 as may be displayed for identifying 805 partners 102. The user selects a partner 102 from list 1301. "Your partners" window 1302 tracks partners identified by the user. This data is used to populate the marketing world display 807.

Figure 14:
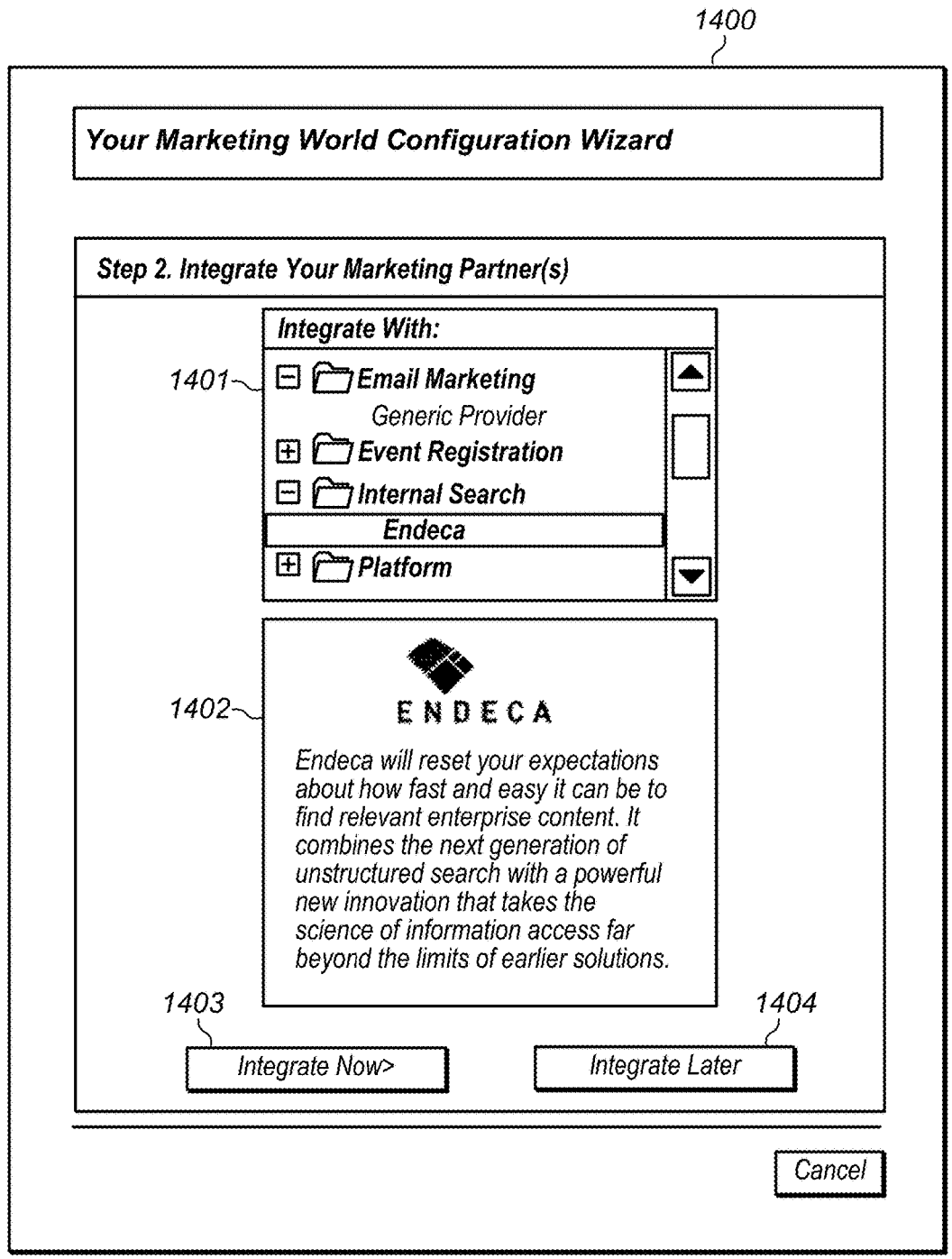
FIG. 14 depicts an example of step 2 of a configuration wizard as may be displayed if the user is a first-time visitor.

FIG. 14 depicts an example of step 2 of a configuration wizard (integrate partners) 1400 as may be displayed for integrating 806 partners 102. The user selects a partner 102 with which to integrate by selecting from list 1401. Information for the selected (highlighted) partner 102 is shown in box 1402. "Integrate Now" button 1403 causes the system to proceed to step 808 to initiate the integration. "Integrate Later" button 1404 causes the system to proceed to marketing world display 807.

FIGS. 15A, 15B, and 15C depict an example of steps 1 to 3 of a partner data sources wizard, corresponding to steps 808, 809, and 810 of FIG. 8. In FIG. 15A, screen 1501 is shown for step 808. The user can enter a name in field 1502 and an email address in field 1503. In FIG. 15B, screen 1504 is shown for step 809. The user can enter, in fields 1505, one or more metrics to be imported, and can click on checkboxes 1506 to indicate which metric(s) are active. In FIG. 15C, screen 1509 is shown for step 810. For each metric entered in screen 1504, the user can map the metric description 1507 to a metric in the site analysis program, by selecting from pull-down menu 1508.

Figures 16A, 16B, 16C:
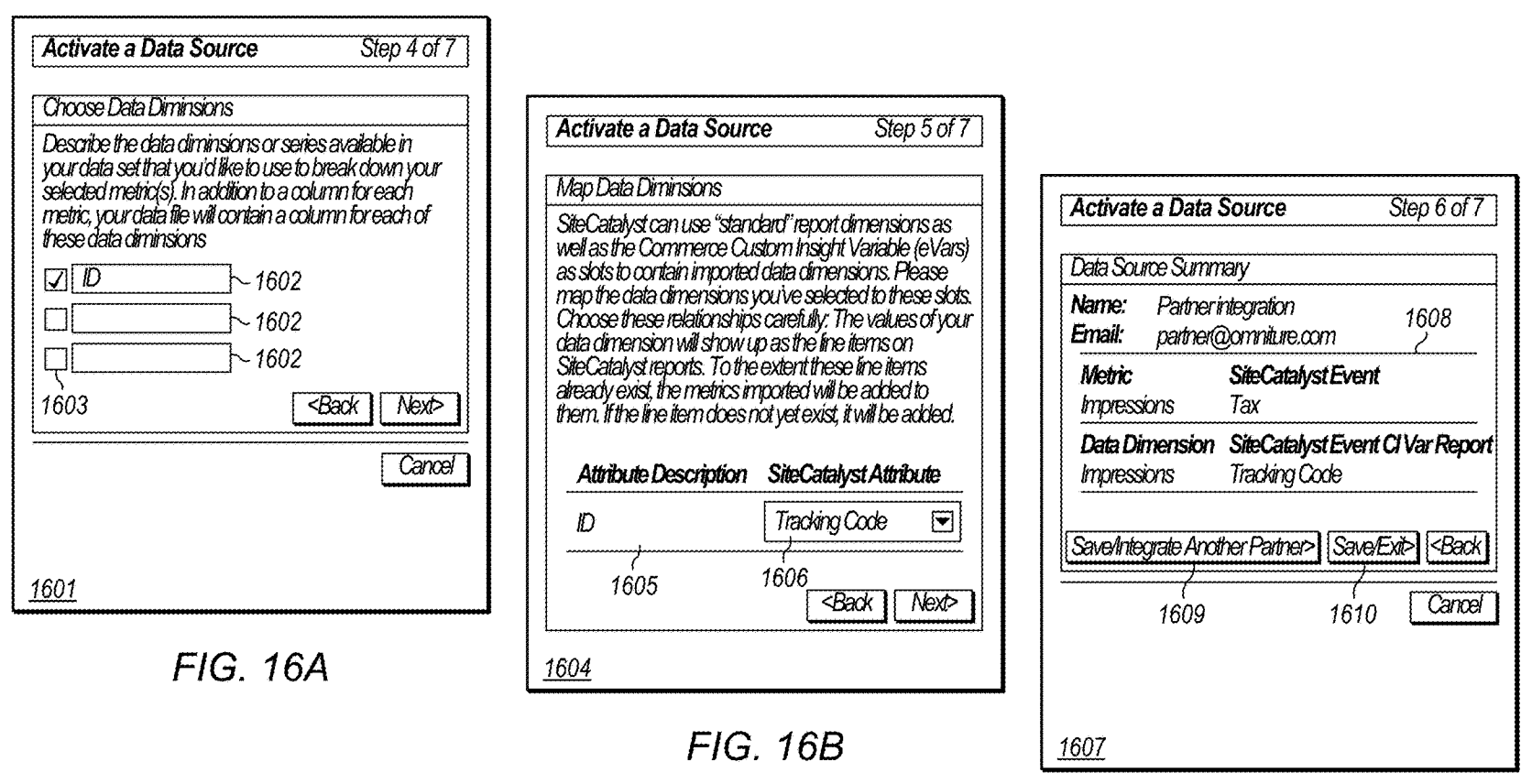

FIGS. 16A, 16B, and 16C depict an example of steps 4 to 6 of a partner data sources wizard, corresponding to steps 811, 812, and 813 of FIG. 8. In FIG. 16A, screen 1601 is shown for step 811. In fields 1602, the user can enter one or more data dimensions for breaking down the selected metric (s). Checkboxes 1603 allow the user to specify which dimension(s) are active. In FIG. 16B, screen 1604 is shown for step 812. For each dimension description entered in screen 1601, the user can map the dimension description 1605 to an attribute associated with the site analysis program, by selecting from pull-down menu 1606.

FIG. 16C depicts screen 1607, where a summary 1608 of data sources is presented, including data and selections made in previous steps. The user can click on "Save/Integrate Another Partner" button 1609 or "Save/Exit" button 1610.

FIG. 17 depicts an example of a screen 1700 for viewing and editing the customer's marketing world, after partners 102 have been integrated. Screen 1700 is similar to screen 1000 shown in FIG. 10, but includes Edit links 1104 allowing the user to edit a previously-added integration, as well as Deactivate links 1105 allowing the user to deactivate a previously-added integration.

Figure 18:
FIG. 18 depicts a detail of the top section of the screen shown in FIG. 17.

FIG. 18 depicts a detail of the top section of the screen shown in FIG. 17.

Figure 19:
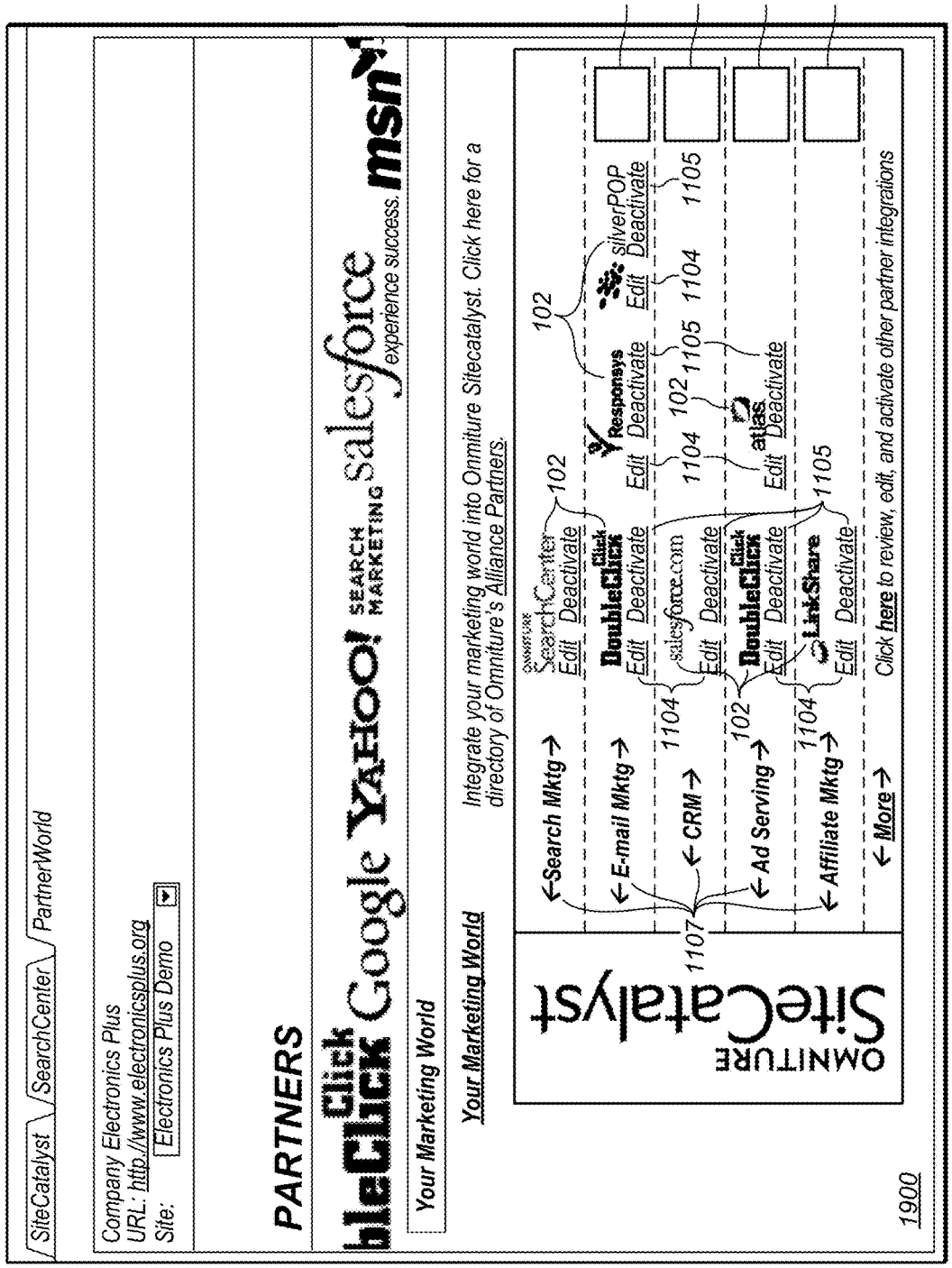
FIG. 19 depicts an alternative example of a screen for viewing and editing the customer's marketing world.

FIG. 19 depicts an alternative example of a screen 1900 for viewing and editing the customer's marketing world. Here, Edit links 1104 and Deactivate links 1105 are shown in a different configuration than that of FIG. 17. Partners 102 are arranged by marketing operation type 1107. Also, Activate New buttons 1106 allow a user to activate new activations for a particular type 1107 of marketing operation.

Figure 20:
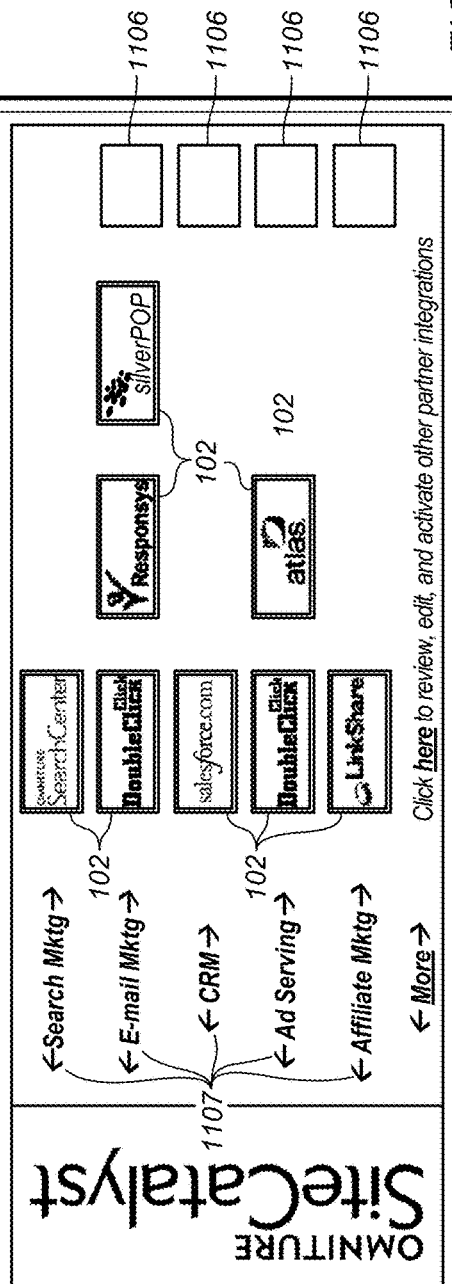
FIG. 20 depicts another alternative example of a screen for viewing and editing the customer's marketing world.

FIG. 20 depicts another alternative example of a screen 2000 for viewing and editing the customer's marketing world. Here, partners 102 are arranged by marketing operation type 1107. Activate New buttons 1106 allow a user to activate new activations for a particular type 1107 of marketing operation.

Figure 21:
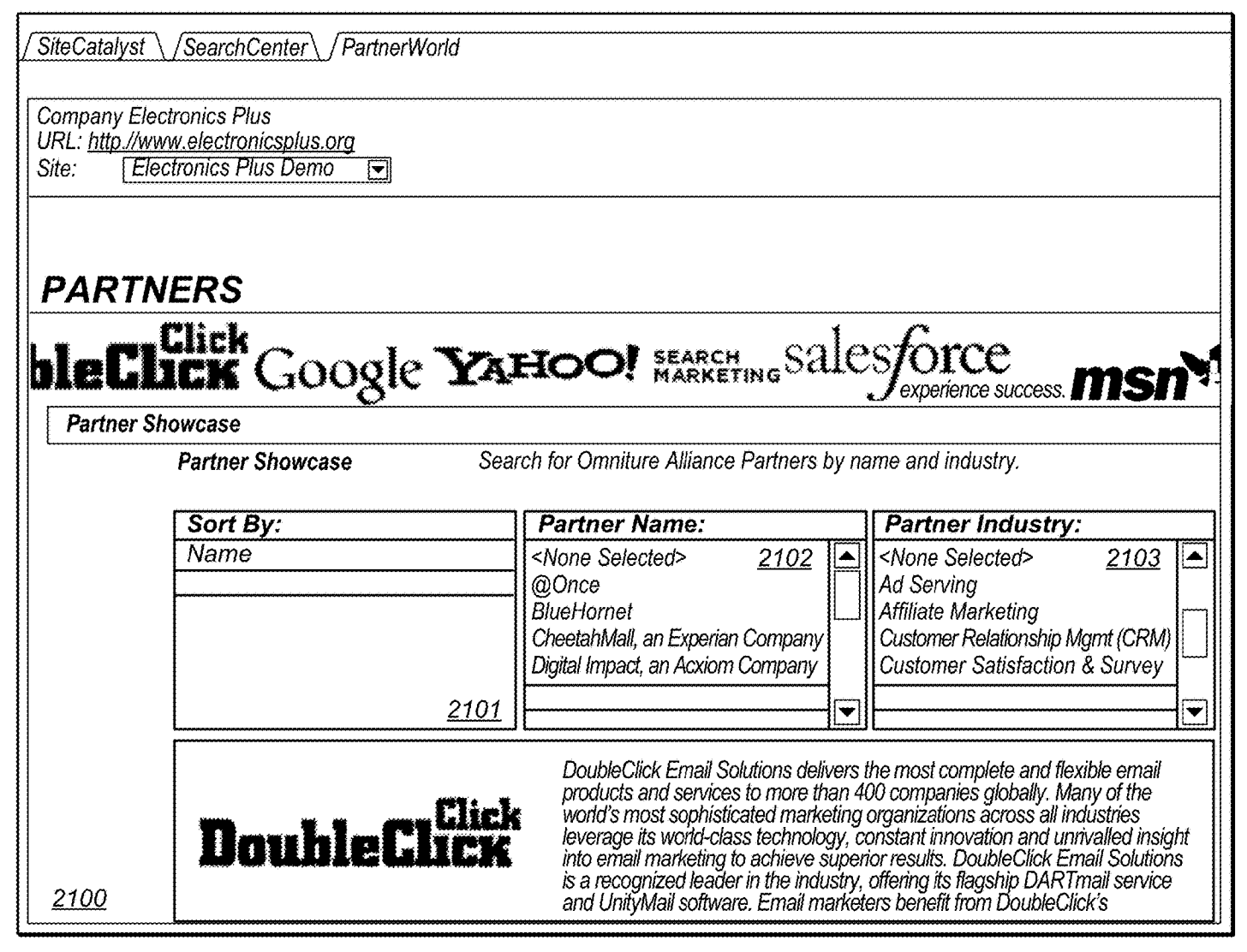

FIG. 21 depicts an example of a screen for viewing and editing partner information in a partner showcase as displayed in connection with step 819 of FIG. 8. The user can view partner information in many different ways. He or she can specify a sort order by selecting from options in box 2101, and can select by partner name by clicking on an item in box 2102, and can select by partner industry by clicking on an item in box 2103.

Figure 22:
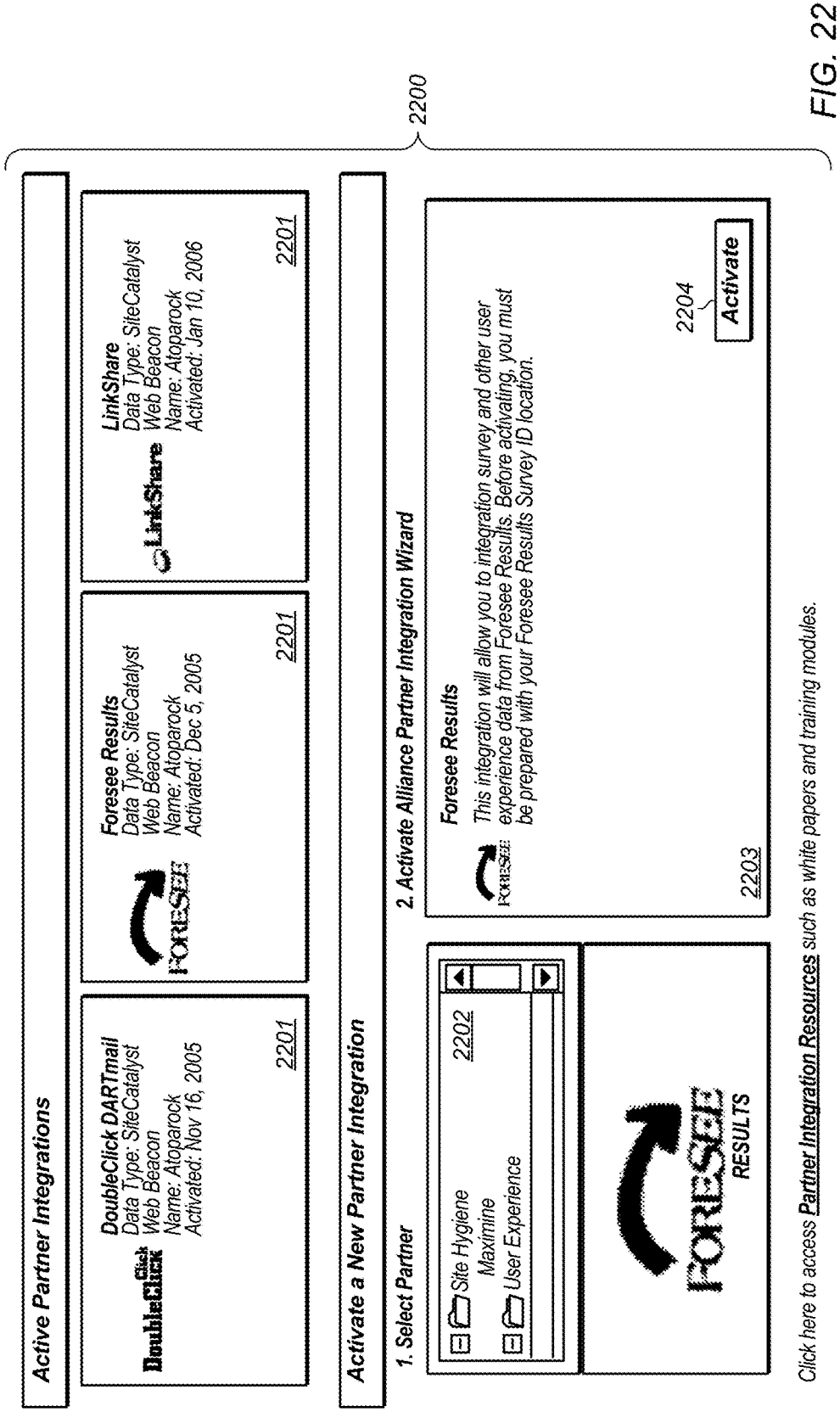
FIG. 22 depicts an example of a screen for viewing and activating partner integrations.

FIG. 22 depicts an example of a screen 2200 for viewing and activating partner integrations, as may be displayed in connection with step 820 of FIG. 8. The user can see active partner integrations in boxes 2201. The user can activate a new partner integration by selecting a partner 102 from list 2202. A description appears in box 2203, and the user can click on button 2204 to activate the integration.

Figure 23:
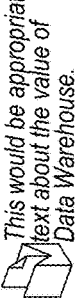
FIG. 23 depicts an example of a screen for showing integration resources.

FIG. 23 depicts an example of a screen 2300 for showing integration resources, as may be displayed in connection with step 821 of FIG. 8. Various resources 2301 can be shown, to allow the user to access white papers, training modules, and the like to help with partner integration efforts. The user can click on various links and icons to access the resources 2301.

Figure 24:
FIG. 24 depicts an example of a screen for showing integration tools.

FIG. 24 depicts an example of a screen for showing integration tools, as may be displayed in connection with step 822 of FIG. 8. Various tools 2401 can be shown, including for example data warehouse and SAINT (an attribute import and naming tool).

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A computer implemented method for integrating at least one partner application in a web analytics application, comprising:
    displaying, via a graphical user interface of a web analytics application executed by a computer, a listing of web analytics partner applications available for integration with other web analytics partner applications via the web analytics application, wherein each of the web analytics partner applications is associated with at least one web marketing service, and wherein the web analytics application includes information on a plurality of data metrics, wherein displaying the listing comprises:
    displaying, in a first display portion of the graphical user interface, a repository comprising the listing of available web analytics partner applications, and
    displaying, in a second display portion of the graphical user interface, an integrations area comprising web analytics partner applications already selected for integration;
    receiving, via the web analytics application, user selection of at least one web analytics partner application of the listing of web analytics partner applications, wherein the at least one web analytics partner application tracks web analytics data and provides the web analytics data from a corresponding data source, wherein receiving the user selection of the at least one displayed web analytics partner application comprises receiving user input dragging a representation of one or more of the at least one displayed web analytics partner applications from the repository and dropping the representation in the integrations area;
    configuring, by the web analytics application, the at least one web analytics partner application by:
    receiving, via the graphical user interface, a first input describing the web analytics data to be imported from the at least one web analytics partner application,
    receiving, via the graphical user interface, a second input selecting one or more data metrics of the plurality of data metrics from the web analytics application to be integrated with the web analytics data, the one or more data metrics stored in corresponding data structures of the web analytics application, and
    applying one or more data dimensions to the one or more data metrics specified by the second input prior to integrating the corresponding elements of the web analytics data into the corresponding data structures of the web analytics application, the one or more data dimensions specified by a third input and applied to analyze the one or more data metrics;
    integrating, by the web analytics application, corresponding elements of the web analytics data described by the first input from the data source into the corresponding data structures of the one or more data metrics selected by the second input, wherein integrating the corresponding elements of the web analytics data into the corresponding data structures causes a bidirectional flow of the web analytics data between the corresponding data source of the at least one web analytics partner application and the corresponding data structures of the web analytics application; and generating, by the web analytics application, output indicating that the corresponding elements of the web analytics data have been successfully integrated.

2. The method of claim 1, wherein the repository comprises the listing of web analytics partner applications available for integration by a current user.

3. The method of claim 1, wherein the method further comprises providing a web-based form for recommending the addition of a web analytics partner application.

4. The method of claim 1, further comprising, prior to receiving user selection of the at least one web analytics partner application, receiving input specifying associations between the available web analytics partner applications and data sources.

5. The method of claim 1, wherein applying the one or more data dimensions to the one or more data metrics specified by the second input comprises:
   receiving a data dimension description provided by the user; and
   receiving a mapping of the data dimension description to a data dimension of the one or more data dimensions specified by the third input.

6. A non-transitory computer readable storage medium comprising program instruction stored thereon, wherein the program instructions are executable by a computer to cause:
   displaying, via a graphical user interface of a web analytics application, a listing of web analytics partner applications available for integration with other web analytics partner applications via a web analytics application, wherein each of the web analytics partner applications is associated with at least one web marketing service, and wherein the web analytics application includes information on a plurality of data metrics wherein displaying the listing comprises:
   displaying, in a first display portion of the graphical user interface, a repository comprising the listing of available web analytics partner applications, and
   displaying, in a second display portion of the graphical user interface, an integrations area comprising web analytics partner applications already selected for integration;
   receiving, via the web analytics application, user selection of at least one web analytics partner application of the listing of web analytics partner applications, wherein the at least one web analytics partner application tracks web analytics data and provides the web analytics data from a corresponding data source, wherein receiving the user selection of the at least one displayed web analytics partner application comprises receiving user input dragging a representation of one or more of the at least one displayed web analytics partner applications from the repository and dropping the representation in the integrations area;
   configuring, by the web analytics application, the at least one web analytics partner application by:
   receiving, via the graphical user interface, a first input describing the web analytics data to be imported from the at least one web analytics partner application,
   receiving, via the graphical user interface, a second input selecting one or more data metrics of the plurality of data metrics from the web analytics application to be integrated with the web analytics data, the one or more data metrics stored in corresponding data structures of the web analytics application, and
   applying one or more data dimensions to the one or more data metrics specified by the second input prior to integrating the corresponding elements of the web analytics data into the corresponding data structures of the web analytics application, the one or more data dimensions specified by a third input and applied to analyze the one or more data metrics;
   integrating, by the web analytics application, the corresponding elements of the web analytics data described by the first input from the data source into the corresponding data structures of the one or more data metrics selected by the second input, wherein integrating the corresponding elements of the web analytics data into the corresponding data structures causes a bidirectional flow of the web analytics data between the corresponding data source of the at least one web analytics partner application and the corresponding data structures of the web analytics application; and
   generating, by the web analytics application, output indicating that the corresponding elements of the web analytics data have been successfully integrated.

7. The computer program product of claim 6, wherein the repository comprises the listing of web analytics partner applications available for integration by a current user.

8. The computer program product of claim 6, further comprising, prior to receiving the user selection of the at least one web analytics partner application, receiving input specifying associations between the available web analytics partner applications and data sources.

9. The computer program product of claim 6, wherein applying the one or more data dimensions to the one or more data metrics specified by the second input comprises:
   receiving a data dimension description provided by the user; and
   receiving a mapping of the data dimension description to a data dimension of the one or more data dimensions specified by the third input.

10. A system for integrating at least one partner application in a web analytics application, comprising:
   a display device, for displaying, via a graphical user interface of a web analytics application, a listing of web analytics partner applications available for integration with other web analytics partner applications via the web analytics application, wherein each of the web analytics partner applications is associated with at least one web marketing service, and wherein the web analytics application includes information on a plurality of data metrics, wherein displaying the listing comprises:
   displaying, in a first display portion of the graphical user interface, a repository comprising the listing of available web analytics partner applications, and
   displaying, in a second display portion of the graphical user interface, an integrations area comprising web analytics partner applications already selected for integration;
   an input device for:
   receiving user selection of at least one web analytics partner application of the listing of web analytics partner products, wherein the at least one web analytics partner application tracks web analytics data and provides the web analytics data from a corresponding data source, wherein receiving the user selection of the at least one displayed web analytics partner application comprises receiving user input dragging a representation of one or more of the at least one displayed web analytics partner applications from the repository and dropping the representation in the integrations area; and
   receiving first input and a second input indicating a desired configuration for the at least one web analytics partner application, wherein the first input describes the web analytics data to be imported from the at least one web analytics partner application and the second input selects one or more data metrics of the plurality of data metrics from the web analytics application to be integrated with the web analytics data, the one or more data metrics stored in corresponding data structures of the web analytics application;

a partner product configuration module of the web analytics application, for (i) applying one or more data dimensions to the one or more data metrics specified by the second input prior to integrating the corresponding elements of the web analytics data into the corresponding data structures of the web analytics application, the one or more data dimensions specified by a third input and applied to analyze the one or more data metrics and (ii) configuring the at least one web analytics partner application according to the first input and the second input;

an integration module of the web analytics application, for integrating, by the web analytics application, corresponding elements of the web analytics data described by the first input from the data source into the corresponding data structures of the one or more data metrics selected by the second input, wherein integrating the corresponding elements of the web analytics data into the corresponding data structures causes a bidirectional flow of the web analytics data between the corresponding data source of the at least one web analytics partner application and the corresponding data structures of the web analytics application; and wherein the display device generates output indicating that the corresponding elements of the web analytics data have been successfully integrated.

11. The system of claim 10, wherein the repository comprises the listing of web analytics partner applications available for integration by a current user.

12. The system of claim 10, further comprising a back-end tool for receiving input specifying associations between available web analytics partner applications and data sources.

13. The system of claim 10, wherein applying the one or more data dimensions to the one or more data metrics specified by the second input comprises:
   receiving a data dimension description provided by the user; and
   receiving a mapping of the data dimension description to a data dimension of the one or more data dimensions specified by the third input.

14. The method of claim 1, further comprising:
   receiving a request to set up a custom data source for a web analytics partner application not included in the listing; and
configuring the custom data source for integration by identifying a specific set of data of the custom data source.

* * * * *